(12) United States Patent
Spohn et al.

(10) Patent No.: US 8,942,899 B1
(45) Date of Patent: Jan. 27, 2015

(54) METHOD AND APPARATUS FOR ENGINE TORQUE CANCELLATION IN A POWERTRAIN SYSTEM

(71) Applicant: GM Global Technology Operations LLC, Detroit, MI (US)

(72) Inventors: Brian L. Spohn, Holly, MI (US); Michael William Roblin, North Royalton, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/973,128

(22) Filed: Aug. 22, 2013

(51) Int. Cl.
*G06F 7/00* (2006.01)
*G06F 17/00* (2006.01)
*G06F 19/00* (2011.01)
*B60W 10/103* (2012.01)
*B60W 10/04* (2006.01)

(52) U.S. Cl.
CPC ............. *B60W 10/103* (2013.01); *B60W 10/04* (2013.01); *B60W 2510/09* (2013.01)
USPC ........................................... 701/54

(58) Field of Classification Search
USPC ................... 701/51, 54; 477/52, 68, 107
See application file for complete search history.

(56) References Cited

U.S. PATENT DOCUMENTS

| | | | |
|---|---|---|---|
| 7,228,209 B2 * | 6/2007 | Izawa et al. | 701/22 |
| 7,529,637 B2 | 5/2009 | Snyder | |
| 8,091,348 B2 * | 1/2012 | Cleary et al. | 60/297 |
| 8,157,035 B2 | 4/2012 | Whitney et al. | |
| 8,170,760 B2 * | 5/2012 | Sato et al. | 701/54 |

\* cited by examiner

*Primary Examiner* — Justin Holmes

(57) ABSTRACT

A powertrain system includes an internal combustion engine rotatably coupled via an input member to a transmission. The transmission has a hydraulic circuit including a hydraulic fluid pump directly mechanically coupled to the input member. A computer-implemented method for operating the powertrain system includes, in response to a command to execute an engine autostop maneuver, determining an engine speed ramping profile to achieve a desired stopped engine position. Hydraulic pressure in the hydraulic circuit is controlled in response to the engine speed ramping profile and engine speed during said engine autostop maneuver.

20 Claims, 4 Drawing Sheets

METHOD AND APPARATUS FOR ENGINE TORQUE CANCELLATION IN A POWERTRAIN SYSTEM

TECHNICAL FIELD

This disclosure is related to powertrain systems including internal combustion engines that can execute autostop and autostart maneuvers.

BACKGROUND

The statements in this section merely provide background information related to the present disclosure and may not constitute prior art.

Powertrain systems include transmission devices and internal combustion engines, including configurations in which the engine executes autostop and autostart maneuvers during ongoing powertrain operation. Such powertrain systems may transmit torque originating from multiple torque generative devices, e.g., the engine and a non-combustion torque machine, through the transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange between the electrical energy storage device and the electric machines to manage outputs of the transmission, including torque and rotational speed.

During both engine autostop maneuvers and engine autostart maneuvers, compression torque pulses are generated in individual engine cylinders and transmitted to an engine crankshaft and a transmission input member, which may result in objectionable vibrations reaching a vehicle operator at resonant frequencies for the powertrain and various driveline components. The compression torque pulses can disturb engine output torque and can result in objectionable physical vibration and audible noise.

SUMMARY

A powertrain system includes an internal combustion engine rotatably coupled via an input member to a transmission. The transmission has a hydraulic circuit including a hydraulic fluid pump directly mechanically coupled to the input member. A computer-implemented method for operating the powertrain system includes, in response to a command to execute an engine autostop maneuver, determining an engine speed ramping profile to achieve a desired stopped engine position. Hydraulic pressure in the hydraulic circuit is controlled in response to the engine speed ramping profile and engine speed during said engine autostop maneuver.

BRIEF DESCRIPTION OF THE DRAWINGS

One or more embodiments will now be described, by way of example, with reference to the accompanying drawings, in which:

FIGS. 3-1 and 3-2 illustrate a process for determining an engine pulse torque cancellation command during an engine autostop maneuver, in accordance with the disclosure;

DETAILED DESCRIPTION

Figure 1:
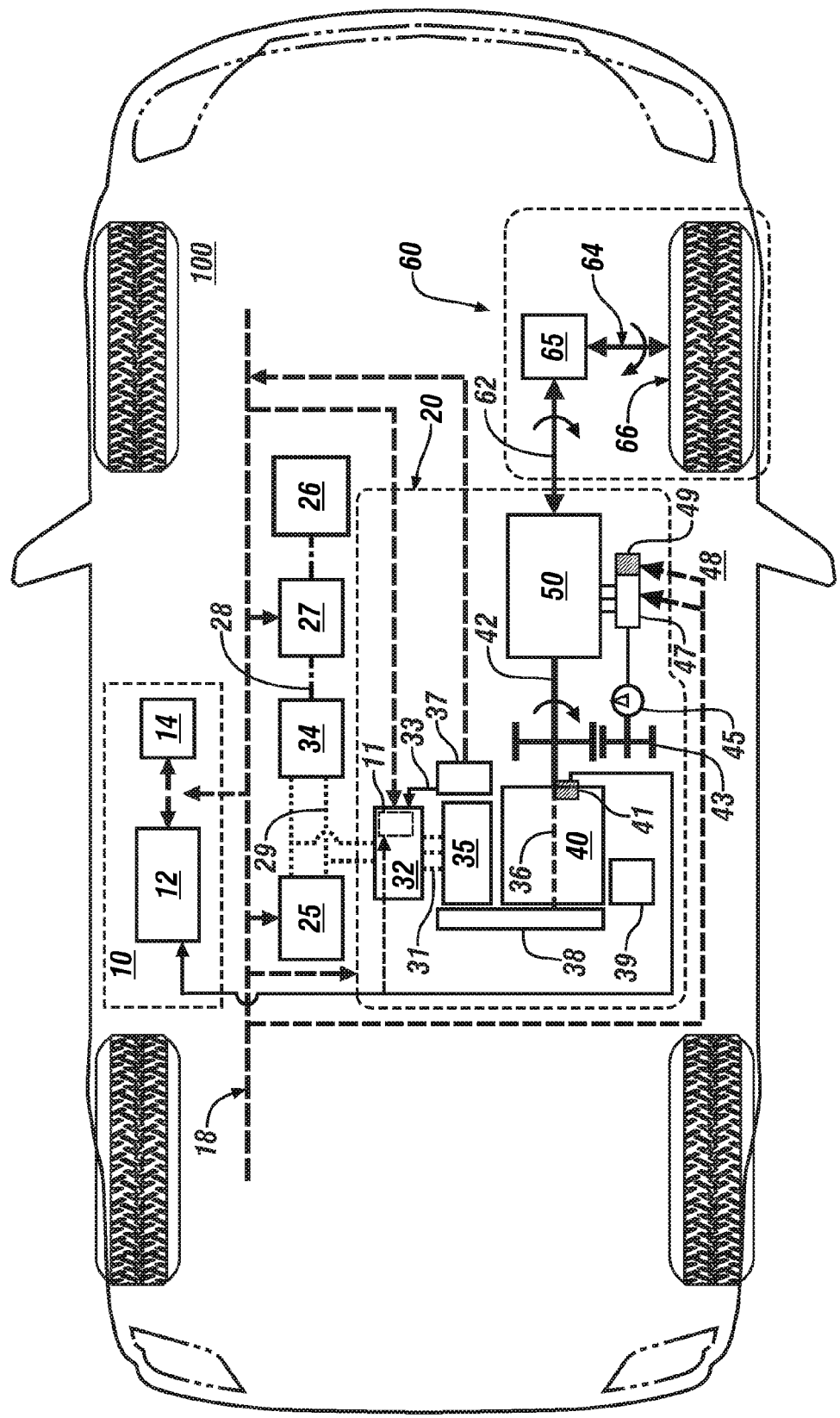
FIG. 1 illustrates a vehicle including a powertrain system including an internal combustion engine that mechanically couples to a transmission and is controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including exemplary powertrain system 20 coupled to a driveline 60 and controlled by a control system 10.

The powertrain system 20 includes an internal combustion engine 40, a transmission 50, and an electrically-powered torque machine 35. The internal combustion engine 40 includes a crankshaft 36 that mechanically rotatably couples to the transmission 50 via an input member 42 and mechanically rotatably couples to the torque machine 35 via a pulley mechanism 38. A hydraulic fluid pump 45 directly mechanically couples to the input member 42 via a direct mechanical linkage, which is a positive-displacement gearing mechanism in one embodiment. The direct mechanical linkage 43 causes an impeller of the hydraulic fluid pump 45 to rotate in concert with rotation of the input member 42, with rotational speed of the hydraulic fluid pump 45 directly proportional to rotational speed of the input member 42. The torque load of the hydraulic fluid pump 45 is dependent upon the configuration of the hydraulic fluid pump 45 and fluidic pressure demand of a hydraulic circuit 47 fluidly coupled thereto. The hydraulic fluid pump 45 fluidly couples to the controllable hydraulic circuit 47 to control flow of pressurized hydraulic fluid to elements of the transmission 50 to activate selected clutch elements and deactivate other selected clutch elements to effect transmission operation in one of a plurality of transmission operating modes. The controllable hydraulic circuit 47 preferably includes multiple fluid control valves, electromechanical solenoids and a controllable hydraulic pressure regulator 49 that is configured to control magnitude of hydraulic pressure in the hydraulic circuit 47 in response to a regulator control signal 48. In one embodiment, the regulator control signal 48 can be a pulsewidth-modulated (PWM)

control signal that achieves a preferred hydraulic pressure in the hydraulic circuit 47. In one embodiment, the regulator control signal 48 is responsive to engine rotational speed to achieve the preferred hydraulic pressure.

The electrically-powered torque machine 35 and the internal combustion engine 40 are torque-generating devices. In one embodiment, the electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including transferring torque from the torque machine 35 to the engine 40 for engine autostart and autostop maneuvers, tractive torque assistance, regeneratively braking the vehicle, and transferring torque from engine 40 to the torque machine 35 for high-voltage electrical charging. In one embodiment, the pulley mechanism 38 includes a serpentine belt routed between the pulley attached to the crankshaft 36 of the engine 40 and another pulley attached to a rotating shaft coupled to a rotor of the torque machine 35, referred to as a belt-alternator-starter (BAS) system. The pulley mechanism 38 is configured with a known pulley ratio K, which defines a ratio between rotation of the engine 40 and rotation of the torque machine 35. Alternatively, the pulley mechanism 38 may include a positive-displacement gearing mechanism. The engine 40 may include a low-voltage solenoid-actuated electrical starter 39 for starting in response to a key-crank event in one embodiment. Other configurations of the electrically-powered torque machine 35, the internal combustion engine 40 and the transmission 50 may be employed without limitation.

The engine 40 is preferably a multi-cylinder internal combustion engine that converts fuel to mechanical torque through a four-cycle thermodynamic combustion process that preferably includes repetitive execution of intake, compression, combustion and exhaust cycles over 720° of engine rotation, i.e., two complete engine revolutions. The engine 40 is equipped with a plurality of actuators and sensing devices for monitoring operation and delivering fuel to form a combustion charge to produce torque that is responsive to an operator torque request. The sensing devices include a crankshaft position sensor 41 for monitoring engine crank angle, which can be employed in monitoring engine position. The crankshaft position sensor 41 can be any suitable rotational position sensing system. In one embodiment the crankshaft position sensor 41 includes a 58× wheel mounted on the crankshaft 36 monitored by an edge-sensing device such as a magnetoresistive (MR) sensor, a Hall-effect sensor, or another sensing device without limitation. The crankshaft position sensor 41 preferably directly signally connects via a wiring harness to control module 12 and to inverter controller 11. The sensing devices also preferably include a camshaft position sensor for monitoring camshaft angle, which can be employed in determining engine position in terms of engine crank angle between 0° and 720° in order to identify one of the intake, compression, combustion and exhaust cycles. The engine 40 is configured to execute autostart and autostop control schemes and fuel cutoff (FCO) control schemes during ongoing operation of the powertrain system 10. The engine 40 is considered to be in an OFF state when it is not rotating. The engine 40 is considered to be in an ON state when it is rotating, including one or more FCO states in which the engine is spinning and unfueled.

The torque machine 35 is preferably a high-voltage multiphase electric motor/generator configured to convert stored electric energy to mechanical power and convert mechanical power to electric energy that may be stored in a high-voltage battery 25. The torque machine 35 includes a rotor and a stator and an accompanying position sensor 37, which is a variable reluctance resolver in one embodiment. The resolver 37 signally connects directly to the inverter controller 11 via harness 33 and is employed to monitor rotational position of the rotor of the torque machine 35. The rotational position of the rotor of the torque machine 35 is used by the inverter controller 11 to control operation of an inverter module 32 that controls the torque machine 35. The inverter controller 11 is preferably co-located with the inverter module 32 (as shown) or, alternatively, may be remotely located, e.g., within control module 12.

A high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including paired power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. The inverter module 32 is configured to receive motor control commands and control inverter states to provide the motor drive and regeneration functionality. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 39.

The transmission 50 preferably employs one or a plurality of differential gear sets and hydraulically-activated clutches to effect torque transfer in one of a plurality of selectable operating modes over a range of speed ratios between the engine 40 and an output member 62. The transmission 50 includes any suitable configuration, and can be an automatic transmission that is configured to automatically shift between a plurality of selectable fixed-gear operating modes to operate at a gear ratio that achieves a preferred match between an operator torque request and an engine operating point. The transmission 50 is controlled using the controllable hydraulic circuit 47, which signally connects to the control module 12 either directly or via communications bus 18. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode.

The driveline 60 may include a differential gear device 65 that mechanically couples to an axle 64 or half-shaft that mechanically couples to a wheel 66 in one embodiment. The driveline 60 transfers tractive power between the transmission 50 and a road surface.

The control system 10 includes control module 12 that signally connects to an operator interface 14. The control module 12 can be a unitary control module that is centrally located to provide operational control of the individual elements of the powertrain system 20, or a plurality of discrete control modules that are co-located with the individual elements of the powertrain system 20 to effect operational control thereof, or some other suitable combination of control modules. The control system 10 may also include hierarchical control of the control modules. The control module 12 preferably signally and operatively connects to individual elements of the powertrain system 20 either directly or via communications bus 18. The control module 12 signally connects to the sensing devices of each of the high-voltage battery 25, the inverter module 32, the torque machine 35, the engine 40, and the transmission 50 to monitor operation and determine the parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), and a steering wheel.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
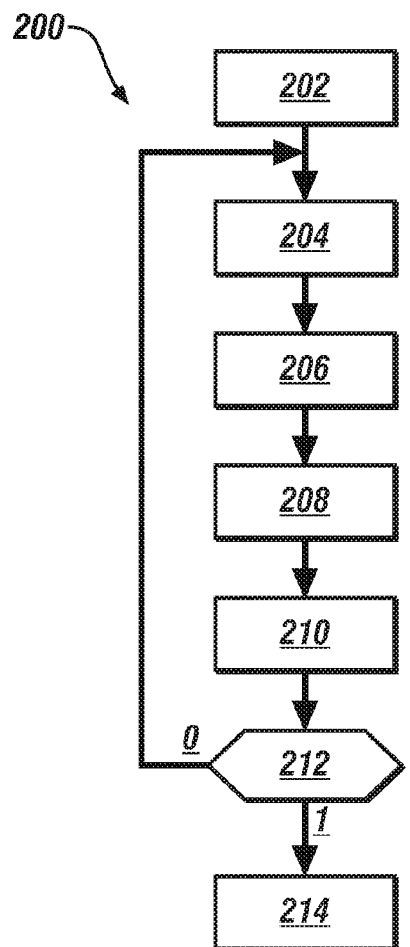
FIG. 2 illustrates a torque cancellation scheme executed to control operation of an internal combustion engine during execution of an engine autostop maneuver, in accordance with the disclosure.

FIG. 2 is a flowchart depicting a torque cancellation scheme 200 for controlling operation of the powertrain system 20 of FIG. 1 during execution of an engine autostop maneuver. The torque cancellation scheme 200 can be executed in a powertrain system including an internal combustion engine that rotatably coupled via an input member to a transmission wherein the transmission includes a hydraulic circuit including a hydraulic fluid pump directly mechanically coupled to the input member. Operation includes determining an engine speed ramping profile in response to a command to execute an engine autostop maneuver to achieve an engine OFF state during ongoing operation of the powertrain system. Hydraulic pressure in the hydraulic circuit can be controlled responsive to the engine speed ramping profile and monitored engine speed. The torque cancellation scheme 200 includes cancelling engine pressure pulses associated with spinning an unfired engine and achieving a parked engine at a preferred or selected engine position. Engine position is preferably described in terms of engine crank angle. Table 1 is provided as a key to FIG. 2 wherein the numerically labeled blocks and the corresponding functions are set forth as follows.

TABLE 1

| BLOCK | BLOCK CONTENTS |
|---|---|
| 202 | Command and execute engine autostop - discontinue engine fueling and ramp down engine speed |
| 204 | Select preferred input speed ramping profile (Ni-ramp) and desired stopped engine position (Θfinal) |
| 206 | Monitor input speed (Ni) and engine position (Θi) |
| 208 | Compare input speed (Ni) with preferred input speed ramping profile (Ni-ramp) AND Compare engine position (Θi) with stopped engine position (Θfinal) |
| 210 | Control hydraulic pressure in transmission system to control torque on hydraulic pump, with corresponding induced torque on transmission input member to control Ni responsive to Ni-ramp AND to control Θi to achieve Θfinal to effect pulse torque cancellation |
| 212 | Ni = 0? |
| 214 | End |

The torque cancellation scheme 200 executes in response to a command to execute an engine autostop maneuver (202), which includes discontinuing engine fueling and ramping down engine speed during ongoing powertrain operation until the engine speed is zero with the engine at a desired stopped engine position (Θfinal). A preferred input speed ramping profile (Ni-ramp) and the desired stopped engine position are selected to ramp down the engine speed to a zero speed state while achieving the desired stopped engine position (204). The preferred input speed ramping profile takes into account engine and powertrain rotational inertias, engine pumping, and other factors that can be employed to determine a ramping profile that reflects a decrease in engine speed that does not require a power-consuming torque intervention that could increase battery discharge or otherwise negatively affect overall vehicle fuel economy.

The input speed (Ni) and engine position (Θi) are monitored (206), and compared to the preferred input speed ramping profile (Ni-ramp) and the desired stopped engine position (Θfinal) using suitable comparative techniques (208). The hydraulic pressure(s) in the transmission system is controlled to effect pulse torque cancellation based upon the comparison between the monitored input speed and the preferred input speed ramping profile and the comparison between the monitored engine position and the desired stopped engine position (210). Controlling the hydraulic pressure in the transmission system includes generating a regulator control signal for a hydraulic pressure regulator to control magnitude of hydraulic pressure in the hydraulic circuit, thus controlling a torque load on the hydraulic fluid pump. In one embodiment, the regulator control signal is a pulsewidth-modulated (PWM) control signal that achieves a preferred hydraulic pressure in the hydraulic circuit. Controlling the torque load on the hydraulic fluid pump can include increasing, decreasing, or maintaining the magnitude of torque on the hydraulic pump, which induces a corresponding torque on the transmission input member to control the rotational speed and position of the input member in response to the aforementioned comparing, including controlling the torque load on the hydraulic fluid pump to effect engine pulse torque cancellation during autostop. FIGS. 3-1, 3-2 and 4 provide additional details about controlling the hydraulic pressure in the transmission system. Such operational control continues so long as the input speed (Ni) is greater than zero RPM (212)(1). When the input speed (Ni) achieves zero RPM indicating the engine is in the OFF state (212)(0), execution of the torque cancellation scheme 200 ends (214).

Figures 1, 3:
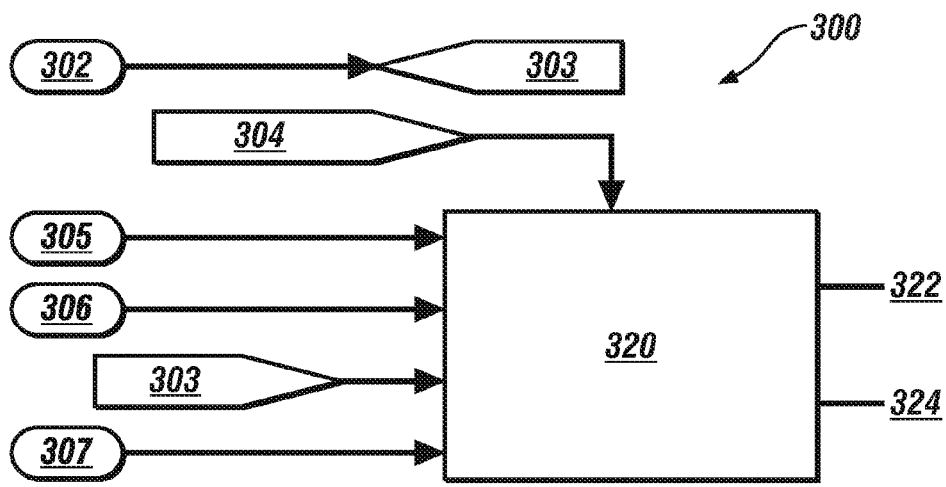
Figures 2, 3:
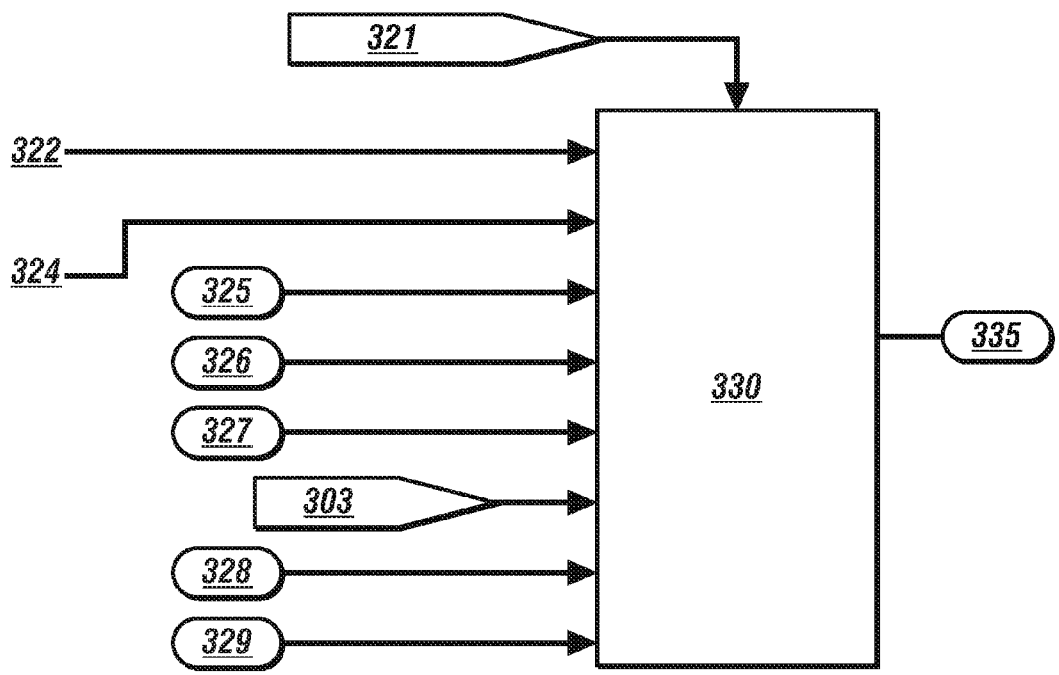

FIGS. 3-1 and 3-2 schematically show details of a process 300 for determining an engine pulse torque cancellation command during an engine autostop maneuver. Signal output 302 from the engine rotational speed sensor is monitored, from which engine speed 303 is determined. In response to a trigger event 304, inputs to an engine crank angle determination routine 320 are monitored, including the engine speed 303, an estimated engine crank angle 305 based upon input from a camshaft position sensor in one embodiment, an estimated engine crank angle error 306, and an arbitrated engine speed source 307. The estimated engine crank angle 305 includes an engine crank angle estimate in context of two complete engine revolutions to provide an estimate of the engine crank angle in relation to the four-stroke combustion process made up of intake, compression, combustion and exhaust cycles over two complete engine revolutions. The engine crank angle determination routine 320 estimates the engine position in terms of an engine crank angle between 0° and 720° based upon the aforementioned inputs, including employing results that are determined experimentally, empirically, predictively, through modeling, or other suitable techniques for accurately predicting operation. The engine crank angle determination routine 320 determines the estimated engine crank angle 322 and an indication of validity 324 of the estimated engine crank angle 322, both which are input to an engine pulse torque prediction routine 330.

The engine pulse torque prediction routine 330 predicts an engine pulse torque during an engine autostop maneuver in response to a trigger event 321. Inputs to the engine pulse torque prediction routine 330 include the estimated engine crank angle 322 and indication of validity 324, along with intake manifold pressure 325, transmission fluid temperature 326 and accompanying indication of validity 327, the engine speed 303, an autostop indicator 328, and a torque cancellation gain term 329. The engine pulse torque prediction routine 330 employs the aforementioned inputs in known slider crank equations that determine cylinder displacements in relation to the engine crank angle to determine individual cylinder pressures and a total cranking torque in unfired cylinders for a selected engine configuration. Such equations can be modeled offline and precalibrated to minimize computational throughput requirements. The pulse torque prediction routine 330 generates a predicted engine pulse torque 335, which can be provided as input to a hydraulic pressure regulator control routine.

Figure 4:
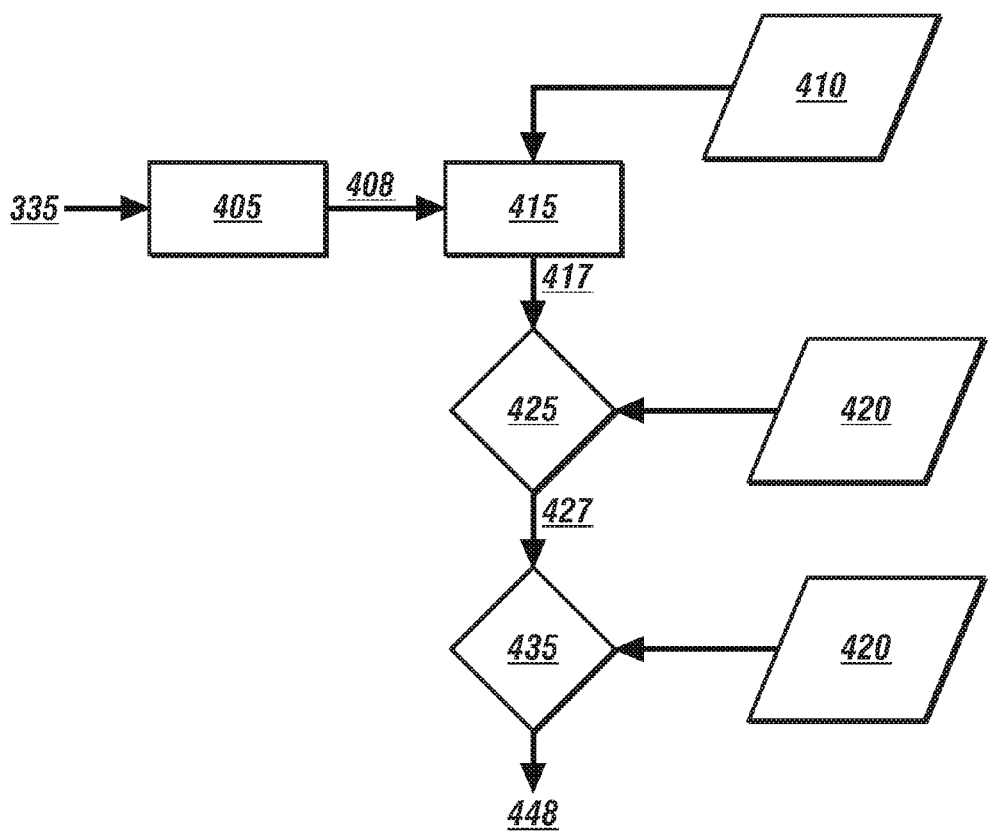
FIG. 4 illustrates a hydraulic pressure regulator control routine that is executed to determine a regulator control signal in response to a predicted engine pulse torque to control the torque load on the hydraulic fluid pump to effect engine pulse torque cancellation during an engine autostop maneuver, in accordance with the disclosure.

FIG. 4 schematically shows a hydraulic pressure regulator control routine 400 implemented in the powertrain system of FIG. 1. The hydraulic pressure regulator control routine 400 is executed to determine a regulator control signal 448 in response to the predicted engine pulse torque 335 to control the torque load on the hydraulic fluid pump to effect engine pulse torque cancellation during engine autostop maneuvers by controlling magnitude of hydraulic pressure in the hydraulic circuit in response to the regulator control signal. Table 2 is provided as a key to FIG. 4 wherein the numerically labeled blocks and the corresponding functions are set forth as follows, corresponding to the hydraulic pressure regulator control routine 400.

TABLE 2

| BLOCK | BLOCK CONTENTS |
| --- | --- |
| 405 | Determine torque command for hydraulic fluid pump based upon predicted engine pulse torque |
| 410 | Determine torque limits based upon engine speed, transmission fluid temperature and pressure |
| 415 | Limit torque command for hydraulic fluid pump based upon torque limits |
| 420 | Determine torque modification associated with transmission fluid temperature, engine speed |
| 425 | Convert limited torque command to hydraulic pressure command subject to the torque modification |
| 435 | Convert hydraulic pressure command to regulator control signal subject to torque modification |

In operation, the predicted engine pulse torque 335 determined with reference to FIG. 3-2 is converted to a torque command 408 for controlling the hydraulic fluid pump (405). This includes determining an engine torque command that counteracts effects of engine pulses occurring during ramping down of engine speed as part of an autostop maneuver.

Torque limits to the output of the hydraulic fluid pump associated with engine speed, transmission fluid temperature and associated pump pressure are determined (410) and applied to the torque command 408 (415) to determine a modified torque command 417. The modified torque command 417 is subjected to limits associated with the engine speed, transmission fluid temperature and pump pressure (420) and the result is converted to a corresponding hydraulic pressure 427 (425). The hydraulic pressure 427 is subjected to the limits associated with the engine speed, transmission fluid temperature and pump pressure (420) and the result is converted to the regulator control signal 448, which is employed to control the controllable hydraulic pressure regulator to control magnitude of hydraulic pressure in the hydraulic circuit in response to a regulator control signal during the autostop maneuver.

Figure 5:
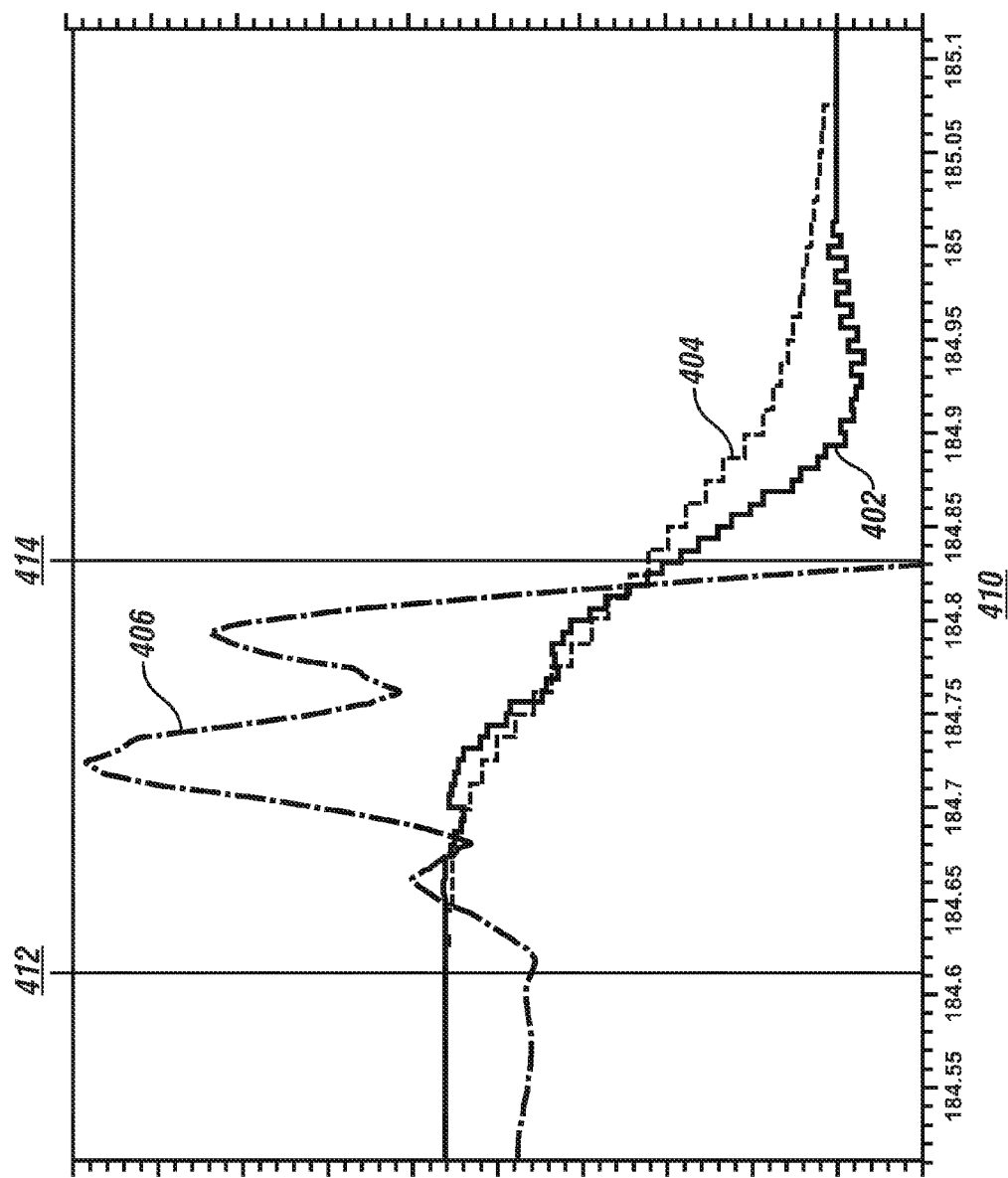
FIG. 5 illustrates operation of an exemplary powertrain system executing the torque cancellation scheme to control hydraulic pressure in a transmission system to control torque on a hydraulic pump, in accordance with the disclosure.

FIG. 5 graphically shows operation of an exemplary powertrain system executing an embodiment of the torque cancellation scheme 200 to control hydraulic pressure in a transmission system to control torque on a hydraulic pump, with corresponding induced torque on transmission input member to control input speed responsive to an input speed ramping profile to effect pulse torque cancellation and to control engine crank angle to achieve a desired stopped engine position. Plotted data include input speed 402, an input speed ramping profile 404, and a cancellation hydraulic pressure 406 to provide cancellation torque on a hydraulic pump 406, all plotted in relation to elapsed time, which is shown on the horizontal axis 410. As shown, upon initiating an autostop maneuver at time 412, the cancellation hydraulic pressure 406 can be used to control input speed 402 to track the input speed ramping profile 404. At time 414, when operation of the torque cancellation scheme 200 is discontinued, the input speed 402 deviates from the input speed ramping profile 404 until they converge as the engine achieves zero RPM. Thus, the induced torque on the transmission input member can be controlled to achieve an input speed that is responsive to an input speed ramping profile and effect pulse torque cancellation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Computer-implemented method for operating a powertrain system including an internal combustion engine rotatably coupled via an input member to a transmission, said transmission comprising a hydraulic circuit including a hydraulic fluid pump directly mechanically coupled to the input member, the method comprising:
in response to a command to execute an engine autostop maneuver:
determining an engine speed ramping profile to achieve a desired stopped engine position; and
controlling hydraulic pressure in the hydraulic circuit responsive to the engine speed ramping profile and engine speed during said engine autostop maneuver.

2. The method of claim 1, wherein controlling the hydraulic pressure in the hydraulic circuit comprises controlling hydraulic pressure in the hydraulic circuit to minimize a difference between the engine speed ramping profile and the engine speed during said engine autostop maneuver.

3. The method of claim 2, wherein controlling hydraulic pressure in the hydraulic circuit further comprises controlling the hydraulic pressure to achieve the desired stopped engine position.

4. The method of claim 1, wherein controlling hydraulic pressure in the hydraulic circuit comprises controlling the hydraulic pressure in the hydraulic circuit to control induced torque on the hydraulic fluid pump.

5. The method of claim 4, wherein controlling the hydraulic pressure in the hydraulic circuit to control the induced torque on the hydraulic fluid pump comprises controlling the hydraulic pressure in the hydraulic circuit to effect engine pulse torque cancellation on the input member.

6. The method of claim 5, wherein controlling the hydraulic pressure in the hydraulic circuit to control the induced torque on the hydraulic fluid pump to effect engine pulse torque cancellation on the input member comprises:
determining engine pulse torque;
determining a torque command for the hydraulic fluid pump based upon the engine pulse torque;
determining torque limits for the hydraulic fluid pump; and
generating a regulator control signal to control a hydraulic pressure regulator of the hydraulic circuit to control magnitude of hydraulic pressure in the hydraulic circuit responsive to the torque command for the hydraulic fluid pump subject to the torque limits for the hydraulic fluid pump.

7. The method of claim 6, wherein determining the torque limits for the hydraulic fluid pump comprises determining the torque limits based upon the engine speed, a transmission fluid temperature and hydraulic pressure.

8. The method of claim 6, wherein determining the engine pulse torque comprises:
determining individual cylinder pressures and a total cranking torque in relation to engine position; and
determining the engine pulse torque based upon the individual cylinder pressures and the total cranking torque in relation to the engine position.

9. The method of claim 1, wherein controlling the hydraulic pressure in the hydraulic circuit comprises generating a regulator control signal to control a hydraulic pressure regulator of the hydraulic circuit to control magnitude of hydraulic pressure in the hydraulic circuit.

10. The method of claim 9, wherein said regulator control signal comprises generating a pulsewidth-modulated control signal.

11. Computer-implemented method for executing an engine autostop maneuver in a powertrain system including an internal combustion engine rotatably coupled via an input member to a transmission, the method comprising:
determining an engine speed ramping profile to achieve a desired stopped engine position; and
controlling hydraulic pressure in a hydraulic circuit of the transmission responsive to the engine speed ramping profile and an engine speed.

12. The method of claim 11, wherein controlling the hydraulic pressure in the hydraulic circuit comprises controlling hydraulic pressure in the hydraulic circuit to minimize a difference between the engine speed ramping profile and the monitored engine speed during said engine autostop maneuver.

13. The method of claim 12, wherein controlling hydraulic pressure in the hydraulic circuit further comprises controlling the hydraulic pressure to achieve the desired stopped engine position.

14. The method of claim 11, wherein controlling hydraulic pressure in the hydraulic circuit comprises controlling the hydraulic pressure in the hydraulic circuit to control induced torque on a hydraulic fluid pump directly mechanically coupled to the input member.

15. The method of claim 14, wherein controlling the hydraulic pressure in the hydraulic circuit to control the induced torque on the hydraulic fluid pump comprises controlling the hydraulic pressure in the hydraulic circuit to effect engine pulse torque cancellation on the input member.

16. The method of claim 15, wherein controlling the hydraulic pressure in the hydraulic circuit to control the induced torque on the hydraulic fluid pump comprises:
determining engine pulse torque;
determining a torque command for the hydraulic fluid pump based upon the engine pulse torque;
determining torque limits for the hydraulic fluid pump; and
generating a regulator control signal to control a hydraulic pressure regulator of the hydraulic circuit to control magnitude of hydraulic pressure in the hydraulic circuit responsive to the torque command for the hydraulic fluid pump subject to the torque limits for the hydraulic fluid pump.

17. The method of claim 16, wherein determining the torque limits for the hydraulic fluid pump comprises determining the torque limits based upon the engine speed, a transmission fluid temperature and hydraulic pressure.

18. The method of claim 16, wherein determining the engine pulse torque comprises:
determining individual cylinder pressures and a total cranking torque in relation to engine position; and determining the engine pulse torque based upon the individual cylinder pressures and the total cranking torque in relation to the engine position.

19. The method of claim 11, wherein controlling the hydraulic pressure in the hydraulic circuit comprises generating a regulator control signal to control a hydraulic pressure regulator of the hydraulic circuit to control magnitude of hydraulic pressure in the hydraulic circuit.

20. The method of claim 19, wherein said regulator control signal comprises a pulsewidth-modulated control signal.

* * * * *